(12) United States Patent
Wu et al.

(10) Patent No.: US 12,266,143 B2
(45) Date of Patent: Apr. 1, 2025

(54) SALIENT FEATURE POINT BASED IMAGE ALIGNMENT

(71) Applicant: KLA Corporation, Milpitas, CA (US)

(72) Inventors: Chaohong Wu, Fremont, CA (US); Songyang Yu, Milpitas, CA (US); Premchandra M. Shankar, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 353 days.

(21) Appl. No.: 17/676,772

(22) Filed: Feb. 21, 2022

(65) Prior Publication Data
US 2022/0327796 A1 Oct. 13, 2022

Related U.S. Application Data

(60) Provisional application No. 63/173,502, filed on Apr. 12, 2021.

(51) Int. Cl.
G06V 10/24 (2022.01)
G06T 7/33 (2017.01)
G06V 10/22 (2022.01)

(52) U.S. Cl.
CPC ............. *G06V 10/24* (2022.01); *G06T 7/337* (2017.01); *G06V 10/22* (2022.01); *G06T 2207/10061* (2013.01)

(58) Field of Classification Search
CPC ...... G06V 10/24; G06V 10/22; G06V 20/698; G06T 7/337; G06T 2207/10061
USPC ........................................................ 382/100
See application file for complete search history.

(56) References Cited

U.S. PATENT DOCUMENTS

| 8,126,255 B2 | 2/2012 | Bhaskar et al. |
| 8,664,594 B1 | 4/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 9,222,895 B2 | 12/2015 | Duffy et al. |
| 9,816,939 B2 | 11/2017 | Duffy et al. |
| 2016/0275672 A1 | 9/2016 | Bhattacharyya et al. |

(Continued)

FOREIGN PATENT DOCUMENTS

| KR | 10-2017-0129892 | 11/2017 |
| KR | 10-2019-0003999 | 1/2019 |
| KR | 10-2020-0116926 | 10/2020 |

OTHER PUBLICATIONS

International Search Report for PCT/US2022/022971 mailed Jul. 13, 2022.

*Primary Examiner* — Stephen P Coleman
(74) *Attorney, Agent, or Firm* — Entropy Matters LLC

(57) ABSTRACT

Methods and systems for image alignment are provided. One method includes selecting three or more salient feature points for use in test image to reference image alignment by applying a selected salient feature point detection method to at least a reference image generated for the specimen. The method also includes detecting the three or more salient feature points in the test image and the reference image and aligning the detected three or more salient feature points in the test image to the detected three or more salient feature points in the reference image. The method further includes aligning remaining portions of the test image to remaining portions of the reference image based on results of the previous aligning step.

19 Claims, 3 Drawing Sheets

(56) References Cited

U.S. PATENT DOCUMENTS

| | | | |
|---|---|---|---|
| 2017/0352146 A1 | 12/2017 | Bhattacharyya | |
| 2019/0139208 A1* | 5/2019 | Chen | G06V 10/7515 |
| 2020/0124837 A1 | 4/2020 | Putnam et al. | |
| 2020/0294224 A1 | 9/2020 | Shaubi et al. | |

* cited by examiner

SALIENT FEATURE POINT BASED IMAGE ALIGNMENT

BACKGROUND OF THE INVENTION

1. Field of the Invention

The present invention generally relates to methods and systems for image alignment using salient feature points for specimens such as wafers and reticles. The embodiments described herein are particularly suitable for wafer level packaging applications.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

One important step that can cause an inspection to fail if not performed correctly and accurately is aligning test and reference images to each other. For example, many inspection processes subtract a reference image from a test image and then apply some defect detection method to the resulting image, often referred to as a difference image. If the images are not properly aligned to each other prior to the subtraction, then many differences between the images caused by poor alignment can be erroneously detected as defects.

Much research and development in inspection processes has therefore been directed towards developing accurate and efficient methods for aligning test and reference images to each other. One existing method that has been widely used involves measuring the offsets at four points on the images for input to a Fourier transform based algorithm and using those offsets to estimate the rotation of one image relative to another. This method provides a very simplistic approach to perform multi-pixel alignment in the presence of relatively large translation and rotation.

There are, however, a number of disadvantages to many of the currently used methods for image alignment. For example, the method described above has many limitations including inaccurate rotation estimation, inability to estimate rotation in some cases, slower computation, etc. Some previously used methods calculate multiple pixel shifts in frequency domain. Its computation has improved compared to brute force normalized cross correlation (NCC) matching. Fast Fourier Transform (FFT)-based whole image alignment can measure relatively large offsets, but the rotation approximation is not accurate enough to deal with smaller image rotation, and the matching failure rate is relatively high. Therefore, such methods significantly limit the number of wafers that can be inspected per hour and have limited sensitivity to defects on the wafer surface.

Accordingly, it would be advantageous to develop systems and methods for aligning images of different dies on a specimen that do not have one or more of the disadvantages described above.

SUMMARY OF THE INVENTION

The following description of various embodiments is not to be construed in any way as limiting the subject matter of the appended claims.

One embodiment relates to a system configured for image alignment. The system includes an imaging subsystem configured to generate a test image of a specimen. The system also includes a computer subsystem configured for selecting three or more salient feature points for use in test image to reference image alignment by applying a selected salient feature point detection method to at least a reference image generated for the specimen. The computer subsystem is also configured for detecting the three or more salient feature points in the test image and the reference image and aligning the detected three or more salient feature points in the test image to the detected three or more salient feature points in the reference image. The computer subsystem is further configured for aligning remaining portions of the test image to remaining portions of the reference image based on results of aligning the detected three or more salient feature points in the test image to the detected three or more salient feature points in the reference image. The system may be further configured as described herein.

Another embodiment relates to a computer-implemented method for image alignment. The method includes generating a test image of a specimen with an imaging subsystem. The method also includes the selecting, detecting, and aligning steps described above, which are performed by a computer subsystem. Each of the steps of the method described above may be performed as described further herein. The embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for image alignment. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
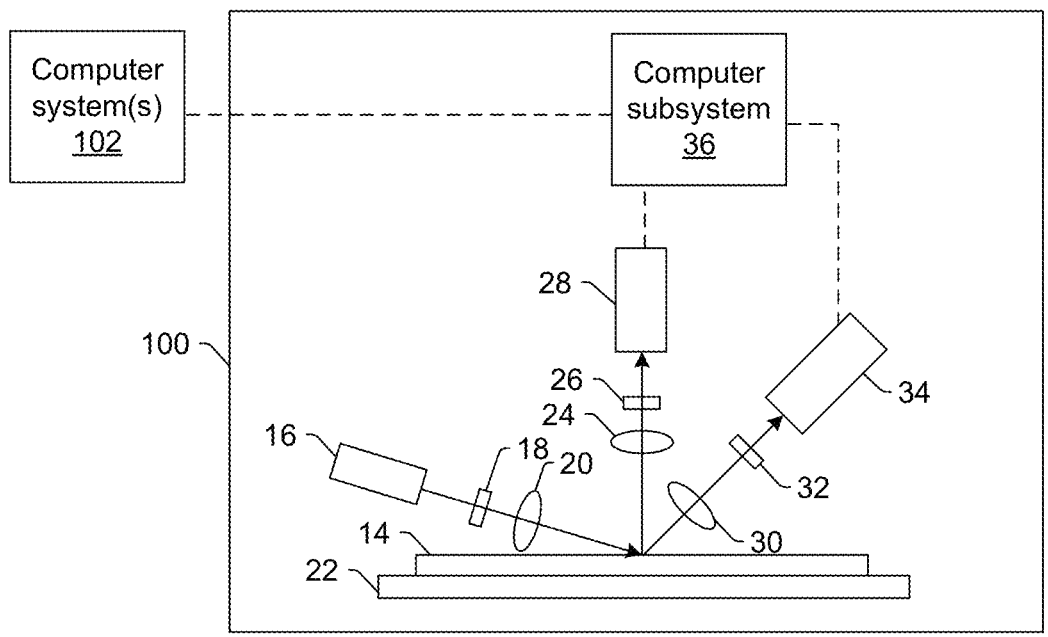
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for image alignment. Certain embodiments relate to image feature points driven die-to-die alignment that is particularly suitable for use in the presence of relatively large translations and rotations between dies.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment relates to a system configured for image alignment. One embodiment of such a system is shown in FIG. 1. The system includes imaging subsystem 100 configured to generate a test image of a specimen. The imaging subsystem includes and/or is coupled to a computer subsystem, e.g., computer subsystem 36 and/or one or more computer systems 102. In the embodiments shown in FIG. 1, the imaging subsystem is configured as a light-based imaging subsystem. In this manner, in some embodiments, the imaging subsystem is configured to generate the test image using light. However, in other embodiments described herein, the imaging subsystem is configured as an electron beam or charged particle beam imaging subsystem. In this manner, in other embodiments, the imaging subsystem is configured to generate the test image using electrons.

In general, the imaging subsystems described herein include at least an energy source, a detector, and a scanning subsystem. The energy source is configured to generate energy that is directed to a specimen by the imaging subsystem. The detector is configured to detect energy from the specimen and to generate output responsive to the detected energy. The scanning subsystem is configured to change a position on the specimen to which the energy is directed and from which the energy is detected.

In the light-based imaging subsystems described herein, the energy directed to the specimen includes light, and the energy detected from the specimen includes light. For example, in the embodiment of the system shown in FIG. 1, the imaging subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example in some instances, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing the light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength (s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The imaging subsystem further includes one or more detection channels. At least one of the detection channel(s) includes a detector configured to detect light from the specimen due to illumination of the specimen by the system and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors. For instance, if the system is configured as an inspection system, the computer subsystem may be configured to detect events (e.g., defects and potential defects) on the specimen using the output of the detectors. Detecting the events on the specimen may be performed as described further herein.

Computer subsystem 36 may be further configured as described herein. For example, computer subsystem 36 may be configured to perform the steps described herein. As such, the steps described herein may be performed "on-tool," by a computer subsystem that is coupled to or part of an imaging subsystem. In addition, or alternatively, computer system(s) 102 may perform one or more of the steps described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, in another embodiment, the imaging subsystem is configured as an electron beam imaging subsystem. In an electron beam imaging subsystem, the energy directed to the specimen includes electrons, and the energy detected from the specimen includes electrons. In one such embodiment shown in FIG. 1a, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

Figure 1A:
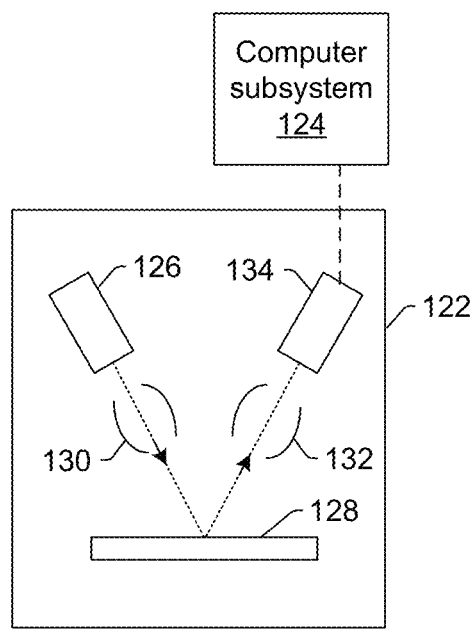

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect events on the specimen using output generated by detector 134, which may be performed as described above or in any other suitable manner. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam imaging subsystem that may be included in the embodiments described herein. As with the optical imaging subsystem described above, the electron beam imaging subsystem configuration described herein may be altered to optimize the performance of the imaging subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 1a except that the electron beam source may be replaced with any suitable ion beam source known in the art. In addition, the imaging subsystem may include any other suitable ion beam imaging system such as those included in commercially available focused ion beam (FIB) systems, helium ion microscopy (HIM) systems, and secondary ion mass spectroscopy (SIMS) systems.

As further noted above, the imaging subsystem may be configured to have multiple modes. In general, a "mode" can be defined by the values of parameters of the imaging subsystem used to generate output for the specimen. Therefore, modes that are different may be different in the values for at least one of the imaging parameters of the imaging subsystem (other than position on the specimen at which the output is generated). For example, for a light-based imaging subsystem, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging subsystem may include more than one illumination channel. As such, different illumination channels may be used for different modes.

The multiple modes may also be different in illumination and/or collection/detection. For example, as described further above, the imaging subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The imaging subsystem may be configured to scan the specimen with the different modes in the same scan or different scans, e.g., depending on the capability of using multiple modes to scan the specimen at the same time.

In one embodiment, the imaging subsystem is configured as an inspection subsystem. In this manner, the systems described herein may be configured as inspection systems. However, the systems described herein may be configured as another type of semiconductor-related quality control type system such as a defect review system and a metrology system. For example, the embodiments of the imaging subsystems described herein and shown in FIGS. 1 and 1a may be modified in one or more parameters to provide different imaging capability depending on the application for which they will be used. In one embodiment, the imaging subsystem is configured as an electron beam defect review subsystem. For example, the imaging subsystem shown in FIG. 1a may be configured to have a higher resolution if it is to be used for defect review or metrology rather than for inspection. In other words, the embodiments of the imaging subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging subsystem 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

The system includes a computer subsystem, which may include any configuration of any of the computer subsystem(s) or system(s) described above. The computer subsystem is configured for selecting three or more salient feature points for use in test image to reference image alignment by applying a selected salient feature point detection method to at least a reference image generated for the specimen. Applying the selected salient feature point detection method may be performed as described further herein, and the selected salient feature point detection method may be selected from one of possible methods as described herein.

Selecting the salient feature points for use in test to reference image alignment (in addition to other steps described herein) may be performed for each test image at runtime. In other words, all of the steps described herein may be performed at runtime on a test image to test image basis. In this manner, each test image of a specimen can be separately and independently aligned to its corresponding reference image with salient feature points selected from its corresponding reference image. In addition, the approaches described herein can be used during runtime without any prior setup steps. However, the same approaches can be used in a setup stage as well where the salient feature points that are used for any one specimen layer at any one point in a fabrication process are selected and then stored for use in image alignment for other specimens (other than the setup specimen) of the same layer at the same point in the fabrication process. The approaches can also be used in a setup stage where the salient feature points are selected for one test image of a specimen and then stored for use in image alignment for additional test images of the specimen that also contain the same salient feature points. In this manner, the salient feature points can be selected as described herein on-the-fly on a test image to test image basis and/or can be stored for use in image alignment of additional test images on the same and/or different specimens.

The reference image to which a selected salient feature point detection method is applied as described herein will most likely be an image generated in a die on the specimen other than the die in which the test image was generated. The reference image may however be a different type of reference image such as a reference image generated from a design database for the specimen, a reference image generated from a different specimen having the same design as the specimen, a reference image generated from images of multiple dies formed on the specimen, etc. For example, even though the embodiments described herein can be used to correct for misalignment and/or rotation between images generated in different dies on a specimen, the embodiments can also be used for aligning the images of a reference die to a test die when the test die has some unexpected or different-than-designed position on the specimen. In this manner, the image alignment described herein may be performed for any two or more images for a specimen that contain at least some common salient feature points. In addition, although the selected salient feature point detection method is applied to the reference image, it does not necessarily have to be applied to only the reference image. For example, if there is a concern that the test and reference images may be substantially different from each other (due to defects or non-defective differences, e.g., color variation, noise, etc.), the selected salient feature point detection method may be applied to both the test and reference images to ensure that the selected salient feature points can be found in both images.

The dies may be any suitable dies formed on the specimen, and although the test and reference images may most commonly be generated in different dies in the applications for which the embodiments described herein are used, the test and reference images may be generated in any other repeating patterned areas formed on the specimen such as fields, areas within the dies or fields, or portions of the dies or fields, etc. The test and reference images that are aligned as described herein may include the entirety of the test and reference images or only a portion of the test and reference images that is of interest to a user. For example, if the image alignment is being performed for an inspection process and not all of a die will be inspected in that process, the image alignment may be performed for only the portion(s) of the die that will be inspected. In addition, the embodiments described herein can be used for any kind of images as long as they have relatively good patterns/feature points for alignment. For example, if an image does not have any pattern in it, then the embodiments described herein will obviously not be useful for such images. Furthermore, in the same way that the selected salient feature points can be used as described herein to align a test image to a reference image, the selected salient feature points can also be used as described herein to align a test image to multiple reference images, e.g., when an inspection process is performed in a double detection manner in which a test image is compared to multiple reference images.

Many different types of salient feature points can be used in the embodiments described herein. Salient feature point types that have been tested by the inventors for the embodiments described herein and have been found to enable substantially accurate wafer image alignment include salient feature points detected by the KAZE, Accelerated-KAZE (AKAZE), Oriented FAST and Rotated BRIEF (ORB), Binary Robust Invariant Scalable Keypoints (BRISK), Fast Retina Keypoint (FREAK), and DAISY algorithms, which may have any suitable configuration known in the art. In addition, Scale-Invariant Feature Transform (SIFT) and Speeded Up Robust Features (SURF) feature points have been tested by the inventors and have proved to be efficient and accurate in point pattern matching for wafer inspection. SIFT features can be generally defined as a set of distinctive invariant local features extracted from images. SURF is an improved version of the SIFT algorithm and is a local image feature detector and descriptor. The SIFT and SURF feature points may be selected and detected using any suitable algorithm known in the art.

In one embodiment, the test image and the reference image are generated in different dies on the specimen. In one such embodiment, at least a portion of the specimen is formed in a wafer level packaging process. For example, the embodiments described herein provide a new salient feature point based method to align images with relatively large offsets and rotations. In advanced wafer level packaging applications, die-to-die displacement can be as large as 60 microns, and rotation from ideal grids could be significant. The die images must be de-rotated and translation must be corrected before performing defect detection. The embodiments described herein advantageously provide a computationally efficient two-step process, in which salient feature points in target (test) and reference images are computed first (and the set of salient feature points in the reference image may be calculated only once), followed by a relatively efficient, preferably optimized matching algorithm or method such as K-nearest neighbor (KNN). After global offset and rotation angle are measured, residual offsets may be measured and corrected for fine alignment, which may be performed as described further herein. Although the embodiments described herein are particularly suitable for use cases in which the shifts and rotations from image-to-image (die-to-die) are significant (and wafer level packaging is one such use case), the embodiments described herein can be extended to any other use case in which images from different dies (or images containing at least some of the same patterns) are aligned to each other.

Figure 2:
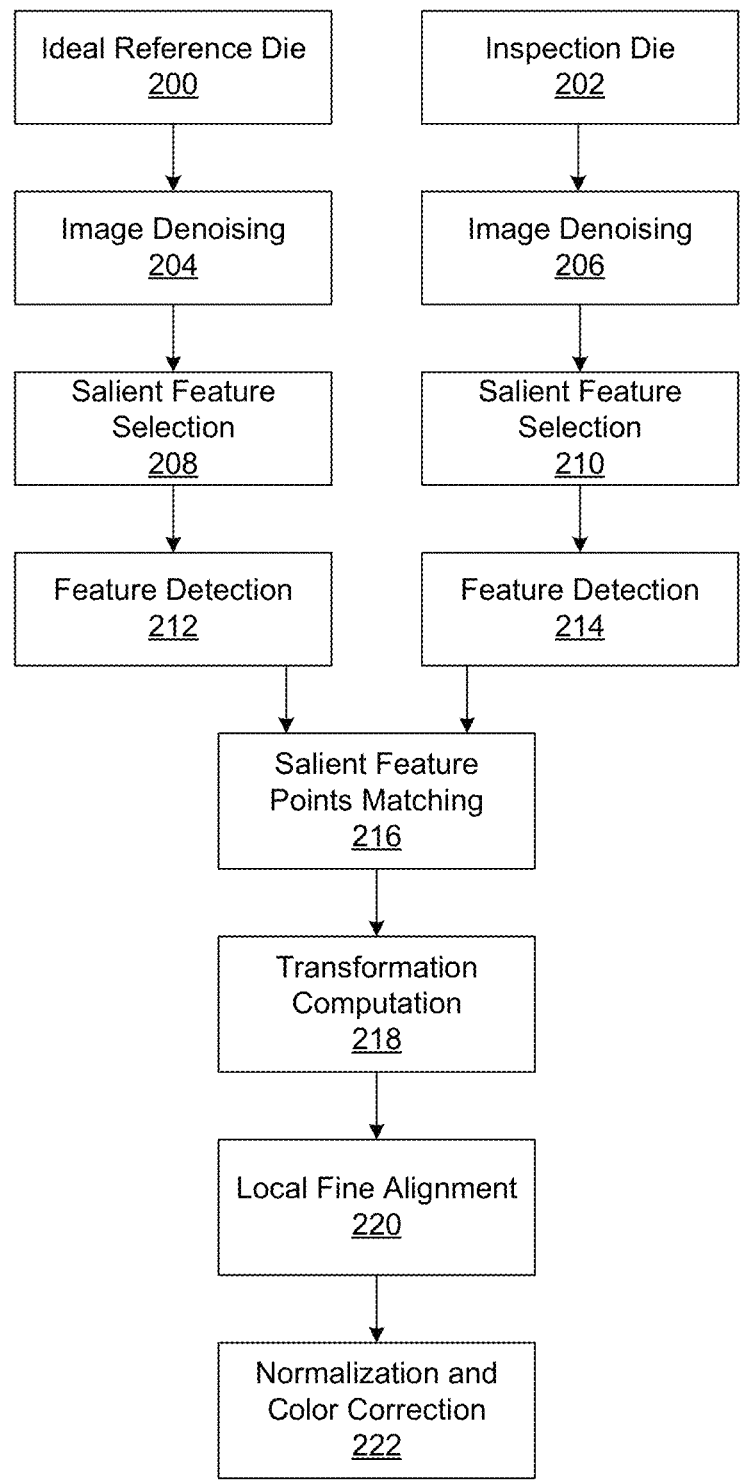
FIG. 2 is a flow chart illustrating an embodiment of steps that may be performed for image alignment.

In some embodiments, prior to selecting the three or more salient feature points, the computer subsystem is configured for denoising the test and reference images. For example, as shown in FIG. 2, both ideal reference die 200 and inspection (test) die 202 images may be input to image denoising steps 204 and 206, respectively. In these steps, the inspection die image and ideal reference die image can be denoised using Principle Component Analysis (PCA), low-pass filter to enhance the wafer images, which may be performed in any suitable manner. The image denoising may also be performed in any other suitable manner known in the art. Salient feature selection steps 208 and 210 may then be performed on the denoised ideal reference die image and the denoised inspection die image, respectively. Steps 208 and 210 may be performed as described further herein.

In another embodiment, prior to selecting the three or more salient feature points, the computer subsystem is configured for selecting one of multiple salient feature point detection methods for use as the selected salient feature point detection method based on one or more characteristics of one or more of the test image or the reference image. In this manner, salient feature point detection methods can be selected based on wafer image characteristics such as texture information, regular geometric objects, geometric corners, etc. The salient feature point detection methods from which one is selected and used in the embodiments described herein may include any suitable salient feature point detection methods known in the art including those salient feature point algorithms described above.

In an additional embodiment, applying the selected salient feature point detection method includes identifying potential salient feature points in at least the reference image, and selecting the three or more salient feature points includes identifying the potential salient feature points that are the best matching points based on matching criteria, clustering the best matching points to filter outliers, and selecting the three or more salient feature points for use in the test image to reference image alignment from the best matching points remaining after the outliers are filtered. For example, based on predetermined matching criteria, best matching points can be clustered to filter outliers. These steps may be performed when the image alignment described herein is performed to correct for rotation differences between the test and reference images, e.g., when estimating an affine transformation used for image alignment. In such cases, at least three sets of corresponding points are required to estimate the affine transformation. In case of multiple sets of corresponding points, there could be a relatively small number of outlier pairs which could skew the estimate. Such outliers may be found as described above and removed before calculating the transformation. The three or more salient feature points may be selected from the feature points remaining after outlier filtering in any suitable manner.

The computer subsystem is also configured for detecting the three or more salient feature points in the test image and the reference image. For example, as shown in FIG. 2, feature detection steps 212 and 214 may be performed on the denoised ideal reference die image and the denoised inspection die image, respectively, based on the results of salient feature selection steps 208 and 210, respectively. Detecting the three or more salient feature points in the test image and the reference image may be performed in any suitable manner using any suitable method or algorithm, which may vary depending on the salient feature points that are selected for use in the embodiments described herein.

The computer subsystem is further configured for aligning the detected three or more salient feature points in the test image to the detected three or more salient feature points in the reference image. For example, as shown in step 216 of FIG. 2, the computer subsystem may perform salient feature points matching. Aligning the detected salient feature points in the test image to the detected salient feature points in the reference image may be performed as described further herein or in any other suitable manner known in the art. In this manner, each of the selected salient feature points detected in the test image may be aligned to its corresponding salient feature point in the reference image. Therefore, this aligning step may be performed on a salient feature point basis.

In some embodiments, the test image and the reference image are generated in different dies on the specimen, and aligning the detected three or more salient feature points in the test image to the detected three or more salient feature points in the reference image corrects for translation and rotation between the different dies on the specimen. For example, by selecting three or more salient feature points for use in the embodiments described herein, rather than just one or two salient feature points, translation and rotation between images can be corrected by the aligning steps described herein. As described further above, correcting for both translation and rotation is particularly important for some applications such as wafer level packaging because different dies on such a specimen can have relatively large displacements from each other both in translation and rotation.

In another embodiment, aligning the detected three or more salient feature points in the test image to the detected three or more salient feature points in the reference image is performed using a K-nearest-neighbor (KNN) method. For example, feature point matching can be performed via brute force or KNN methods. Randomized KNN or fast library for approximation KNN (FLANN) from the existing OpenCV library can also be used for this aligning step. While such alignment methods may be particularly useful for the embodiments described herein, the embodiments are not limited in the alignment method that is used for the detected salient feature points. In general, depending on the selected salient feature points, any suitable method or algorithm that can be used for aligning images of those salient feature points can be used for this aligning step.

In some embodiments, aligning the detected three or more salient feature points in the test image to the detected three or more salient feature points in the reference image includes determining a secondary feature of the detected three or more salient feature points in the test image and the detected three or more salient feature points in the reference image and aligning the secondary feature of the test image to the secondary feature of the reference image. For example, a set of feature points in the target die image and a set of feature points in the reference die image can be detected, and derived secondary features (like tri-plex) can be used to search for a corresponding matching set so that coarse alignment can be efficiently computed if two sets of feature points share enough common subset. In other words, a set of secondary corresponding points such as distance or angle of triple feature points can be derived from two images and used for corresponding matching instead of absolute locations (x,y). This is an optional step.

The computer subsystem is also configured for aligning remaining portions of the test image to remaining portions of the reference image based on results of aligning the detected three or more salient feature points in the test image to the detected three or more salient feature points in the reference image. As described further herein, there are different ways to perform this aligning step depending on how the first aligning step is performed and what the results of that first aligning step are. In the most general method, the results of aligning the salient feature points in the different images to each other may include some transformation of the locations of the salient feature points in the test image to the locations of the salient feature points in the reference image (or from the original locations of the salient feature points in the test image to the aligned locations of the salient feature points in the test image). The transformation may be in coordinates or some other way of describing the differences between 1) the original positions of the test image salient feature points relative to the reference image salient feature points and 2) the aligned positions of the test image salient feature points relative to the reference image salient feature points. The transformation may have any suitable format known in the art and as described further herein may correct for only translation or both translation and rotation. That transformation determined from only the salient feature points in the test and reference images may then be applied to other portions of the test image to thereby align those other portions of the test image to the reference image.

In one embodiment, aligning the detected three or more salient feature points in the test image to the detected three or more salient feature points in the reference image includes determining an individual offset measurement for each of the detected three or more salient feature points in the test image relative to the detected three or more salient feature points in the reference image and determining a global offset from the individual offset measurements, and the results of the aligning on which aligning the remaining portions of the test image to the remaining portions of the reference image is based includes the global offset. For example, from the individual offset measurements, a global offset may be determined, which may be performed in any suitable manner known in the art. From these measurements, the computer subsystem may determine by what amount each column and row of pixels should be shifted. In this manner, the aligning of the remaining portions of the test and reference images to each other does not necessarily include rotating the test image. For example, if the rotation angle exceeds a relatively small fraction of a degree, the images can be still de-skewed by shifting each column and row of pixels by the predetermined amount. This method of de-skewing the image is computationally much faster than a 2D image rotation.

Figure 3:
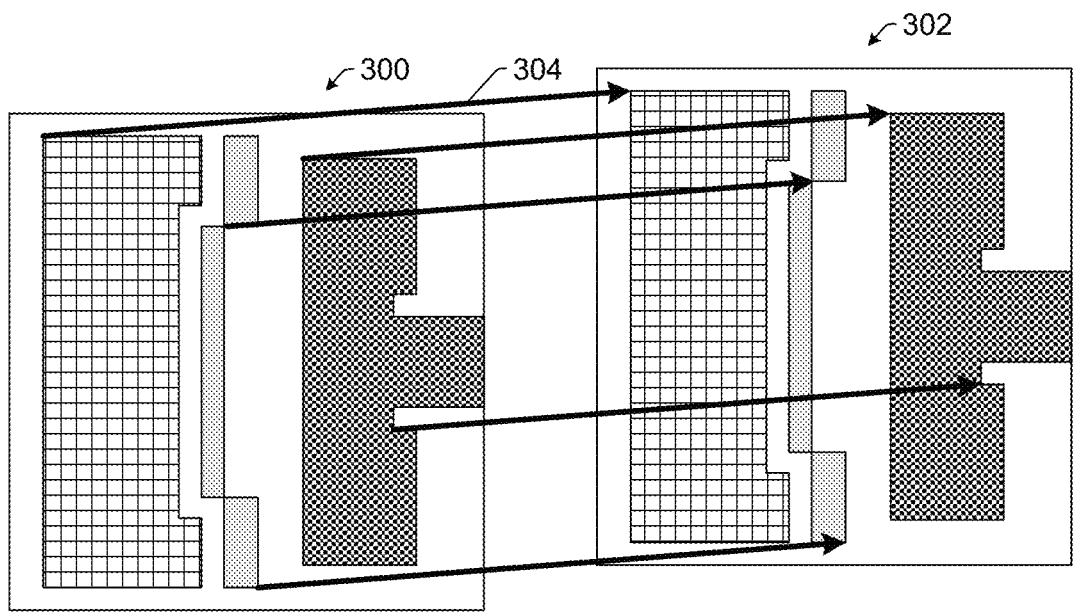
FIG. 3 is a schematic diagram illustrating a plan view of an example of a test die image and how it may be shifted for image alignment performed as described herein.

In another embodiment, aligning the detected three or more salient feature points in the test image to the detected three or more salient feature points in the reference image includes determining an individual offset measurement for each of the detected three or more salient feature points in the test image relative to the detected three or more salient feature points in the reference image and determining a global offset and rotation angle from the individual offset measurements, and the results of the aligning on which aligning the remaining portions of the test image to the remaining portions of the reference image is based includes the global offset and the rotation angle. For example, from the individual offset measurements, a global offset and rotation angle may be determined, which may be performed in any suitable manner known in the art. From these measurements, the computer subsystem may determine by what amount each column and row of pixels should be shifted. In one such example, as shown in FIG. 3, image 302 may be obtained from image 300 by shifting right 100 pixels and shifting up 100 pixels as shown by arrows 304 and subsequently rotating the shifted image by 0.1 degree.

In an additional embodiment, aligning the detected three or more salient feature points in the test image to the detected three or more salient feature points in the reference image includes determining an affine transformation, and the results of the aligning on which aligning the remaining portions of the test image to the remaining portions of the reference image is based includes the affine transformation. In Euclidean geometry, an affine transformation is generally defined as a geometric transformation that preserves lines and parallelism. The affine transformation may be any suitable affine transformation known in the art. Using three (or more) salient feature points, the affine transformation can be computed so that shift and rotation can be measured and corrected. In one such example, as shown in step 218 in FIG. 2, the computer subsystem may perform transformation computation based on results of salient feature point matching step 216, and the transformation that is computed in this step may be an affine transformation or any other suitable coordinate transformation.

In one embodiment, after aligning the remaining portions of the test image to the remaining portions of the reference image, the computer subsystem is configured for performing fine alignment of the test image to the reference image by separating the test image and reference image into smaller test and reference images, respectively, and aligning the smaller test and reference images to each other. For example, as shown in step 220 of FIG. 2, the computer subsystem may perform local fine alignment. In this step, the images may be broken down into smaller tiles that are individually aligned using any suitable substantially precise and efficient method since most of the offsets have been taken out by the first alignment step. The smaller tiles may have any suitable sizes, which may vary depending on characteristics of the original test image.

In one such embodiment, aligning the smaller test and reference images to each other includes sub-pixel interpolation. For example, in the final alignment step, relatively small local misalignments can be measured and corrected using sub-pixel interpolation. "Sub-pixel" as that term is used herein is generally defined as smaller than a pixel of output generated by an imaging subsystem. Sub-pixel interpolation may be performed in any suitable manner.

In another such embodiment, after performing the fine alignment, the computer subsystem is configured for performing normalization and color correction of the test image relative to the reference image. For example, as shown in step 222 of FIG. 2, the computer subsystem may perform normalization and color correction. Normalization and color correction may be performed in any suitable manner known in the art.

In some embodiments, after aligning the remaining portions of the test image to the remaining portions of the reference image, the computer subsystem is configured for detecting defects in the test image by subtracting the reference image from the test image. The results of subtracting the reference image from the test image may be commonly referred to in the art as a "difference image." Detecting the defects may also include applying some threshold to the difference image, and that threshold may be commonly referred to in the art as a defect detection threshold. Any image signals or data in the difference image having a value above the threshold may be identified by the computer subsystem as a defect or potential defect. All other image signals or data in the difference image may not be identified as a defect or potential defect. Of course, this is perhaps the most simple version of how defect detection can be performed using results of subtracting a reference image from a test image. The embodiments described herein are not limited in the defect detection method or algorithm that can be used with the test and reference images. For example, once the reference image has been subtracted from the test image, there are many different types of defect detection methods or algorithms that can be used to detect defects or potential defects in the resulting difference image. Any or all such defect detection methods or algorithms can be used in the embodiments described herein, and an appropriate method or algorithm can be selected based on information about the specimen.

The computer subsystem may be configured for generating results for the specimen, which may include any of the results or information described herein. The results for the specimen may be generated by the computer subsystem in any suitable manner. All of the embodiments described herein may be configured for storing results of one or more steps of the embodiments in a computer-readable storage medium. The results may include any of the results described herein and may be stored in any manner known in the art. The results for the specimen may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem described herein may include information for any defects detected on the specimen such as location, etc., of the bounding boxes of the detected defects, detection scores, information about defect classifications such as class labels or IDs, any defect attributes determined from any of the images, etc., or any such suitable information known in the art. That information may be used by the computer subsystem or another system or method for performing additional functions for the specimen and/or the detected defects such as determining defect classifications for the defects, filtering the defects to remove nuisances and/or defects not of interest, sampling the defects for defect review or other analysis, determining a root cause of the defects, etc.

In addition to the functions described above, such functions further include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the detected defects. The changes to the process may include any suitable changes to one or more parameters of the process. The computer subsystem preferably determines those changes such that the detected defects can be reduced or prevented on other specimens on which the revised process is performed, the detected defects can be corrected or eliminated on the specimen in another process performed on the specimen, the detected defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein can allow inspection processes and tools to detect defects with increased sensitivity due to the relatively high accuracy image alignment enabled by the embodiments described herein. This increased sensitivity to defects allows users to improve their ability to make correct processing decisions.

The embodiments described herein can also be used for setting up an image-based process like inspection, defect review, metrology, etc. For example, the embodiments described herein can be used to select salient feature points that are used for multiple specimens of the same type. Information for the selected salient feature points can be stored as described above and used for any process that includes image alignment performed for any specimens of the same type. The ability to substantially accurately align images enabled by the embodiments described herein provides significant advantages for the process in which the images are aligned like reduced time to results, increased robustness, better performance of the resulting process, etc.

The embodiments described herein have a number of advantages in addition to those already described. For example, the embodiments described herein provide efficient use of salient feature points for image alignment methods and faster corresponding points matching by using feature points with context texture information and gradient statistics. The type of algorithm used for finding corresponding feature points and matching them is inherently faster than currently used methods and systems. In addition, the new image alignment methods described herein may utilize salient feature points to compute a geometric affine transformation (mainly translation and rotation) between target and reference die images and thereby provide improved accuracy in estimation of affine transformation parameters. The embodiments can also significantly reduce the matching computation complexity compared to previous Fast Fourier Transform (FFT)-based multi-pixel alignment involving every pixel, and the embodiments described herein can increase the rotation limit (0.1 degree) because the selected salient feature point detection methods are shift and rotation invariant. In this manner, the embodiments can inspect dies on a wafer with relatively large offsets and rotations with greater sensitivity and precision because the embodiments can select shift and rotation invariant feature points. The embodiments described herein are also applicable in measuring orientation of dies in wafer-level images of dies and in laser scanning tools. Furthermore, the embodiments described herein provide a significantly faster computation than the previously used methods because the ideal reference die image may only need to be used to detect salient feature points once. In other words, if salient feature points are determined at a setup step on an ideal reference die, then the method is significantly faster than the old methods.

Each of the embodiments described above may be combined together into one single embodiment. In other words, unless otherwise noted herein, none of the embodiments are mutually exclusive of any other embodiments.

Another embodiment relates to a computer-implemented method for image alignment. The method includes generating a test image of a specimen with an imaging subsystem, which may be configured according to any of the embodiments described herein. The method also includes the selecting, detecting, and aligning steps described above. The steps are performed by a computer subsystem, which may be configured according to any of the embodiments described herein.

Each of the steps of the method may be performed as described further herein. The method may also include any other step(s) that can be performed by the imaging subsystem and/or computer subsystem described herein. In addition, the method described above may be performed by any of the system embodiments described herein.

Figure 4:
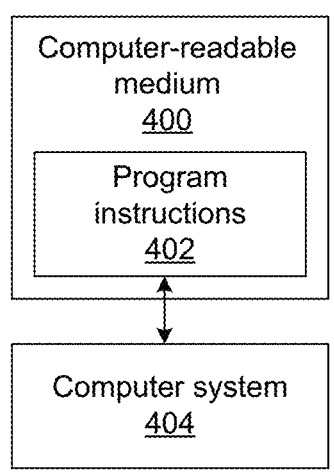
FIG. 4 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for image alignment. One such embodiment is shown in FIG. 4. In particular, as shown in FIG. 4, non-transitory computer-readable medium 400 includes program instructions 402 executable on computer system 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 404 may be configured according to any of the embodiments described herein.

Further modifications and alternative embodiments of various aspects of the invention will be apparent to those skilled in the art in view of this description. For example, methods and systems for image alignment are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for image alignment, comprising:
an imaging subsystem configured to generate a test image of a specimen, wherein the imaging subsystem comprises an energy source configured to generate energy directed to the specimen by the imaging subsystem and a detector configured to detect energy from the specimen and to generate output responsive to the detected energy, wherein the imaging subsystem is further configured to generate the test image from the output generated by the detector, and wherein the specimen comprises a wafer or a reticle; and
a computer subsystem configured for:
selecting three or more salient feature points for use in test image to reference image alignment by applying a selected salient feature point detection method to at least a reference image generated for the specimen, wherein the selected three or more salient feature points are shift and rotation invariant because the selected salient feature point detection method is shift and rotation invariant;
detecting the three or more salient feature points in the test image and the reference image;
aligning the detected three or more salient feature points in the test image to the detected three or more salient feature points in the reference image;
aligning remaining portions of the test image to remaining portions of the reference image based on results of aligning the detected three or more salient feature points in the test image to the detected three or more salient feature points in the reference image; and
after aligning the remaining portions of the test image to the remaining portions of the reference image, detecting defects in the test image by subtracting the reference image from the test image.

2. The system of claim 1, wherein the test image and the reference image are generated in different dies on the specimen.

3. The system of claim 1, wherein the test image and the reference image are generated in different dies on the specimen, and wherein at least a portion of the specimen is formed in a wafer level packaging process.

4. The system of claim 1, wherein prior to selecting the three or more salient feature points, the computer subsystem is further configured for denoising the test and reference images.

5. The system of claim 1, wherein prior to selecting the three or more salient feature points, the computer subsystem is further configured for selecting one of multiple salient feature point detection methods for use as the selected salient feature point detection method based on one or more characteristics of one or more of the test image or the reference image.

6. The system of claim 1, wherein applying the selected salient feature point detection method comprises identifying potential salient feature points in at least the reference image, and wherein said selecting comprises identifying the potential salient feature points that are the best matching points based on matching criteria, clustering the best matching points to filter outliers, and selecting the three or more salient feature points for use in the test image to reference image alignment from the best matching points remaining after the outliers are filtered.

7. The system of claim 1, wherein aligning the detected three or more salient feature points in the test image to the detected three or more salient feature points in the reference image comprises determining an individual offset measurement for each of the detected three or more salient feature points in the test image relative to the detected three or more salient feature points in the reference image and determining a global offset from the individual offset measurements, and wherein the results of the aligning on which aligning the remaining portions of the test image to the remaining portions of the reference image is based comprises the global offset.

8. The system of claim 1, wherein aligning the detected three or more salient feature points in the test image to the detected three or more salient feature points in the reference image comprises determining an individual offset measurement for each of the detected three or more salient feature points in the test image relative to the detected three or more salient feature points in the reference image and determining a global offset and rotation angle from the individual offset measurements, and wherein the results of the aligning on which aligning the remaining portions of the test image to the remaining portions of the reference image is based comprises the global offset and the rotation angle.

9. The system of claim 1, wherein the test image and the reference image are generated in different dies on the specimen, and wherein aligning the detected three or more salient feature points in the test image to the detected three or more salient feature points in the reference image corrects for translation and rotation between the different dies on the specimen.

10. The system of claim 1, wherein aligning the detected three or more salient feature points in the test image to the detected three or more salient feature points in the reference image comprises determining an affine transformation, and wherein the results of the aligning on which aligning the remaining portions of the test image to the remaining portions of the reference image is based comprises the affine transformation.

11. The system of claim 1, wherein aligning the detected three or more salient feature points in the test image to the detected three or more salient feature points in the reference image is performed using a K-nearest-neighbor method.

12. The system of claim 1, wherein aligning the detected three or more salient feature points in the test image to the detected three or more salient feature points in the reference image comprises determining a secondary feature of the detected three or more salient feature points in the test image and the detected three or more salient feature points in the reference image and aligning the secondary feature of the test image to the secondary feature of the reference image.

13. The system of claim 1, wherein after aligning the remaining portions of the test image to the remaining portions of the reference image, the computer subsystem is further configured for performing fine alignment of the test image to the reference image by separating the test image and the reference image into smaller test and reference images, respectively, and aligning the smaller test and reference images to each other.

14. The system of claim 13, wherein aligning the smaller test and reference images to each other comprises sub-pixel interpolation.

15. The system of claim 13, wherein after performing the fine alignment, the computer subsystem is further configured for performing normalization and color correction of the test image relative to the reference image.

16. The system of claim 1, wherein the imaging subsystem is further configured to generate the test image using light.

17. The system of claim 1, wherein the imaging subsystem is further configured to generate the test image using electrons.

18. A non-transitory computer-readable medium, storing program instructions executable on a computer system for performing a computer-implemented method for image alignment, wherein the computer-implemented method comprises:
　generating a test image of a specimen with an imaging subsystem, wherein the imaging subsystem comprises an energy source configured to generate energy directed to the specimen by the imaging subsystem and a detector configured to detect energy from the specimen and to generate output responsive to the detected energy, wherein the imaging subsystem is configured to generate the test image from the output generated by the detector, and wherein the specimen comprises a wafer or a reticle;
　selecting three or more salient feature points for use in test image to reference image alignment by applying a selected salient feature point detection method to at least a reference image generated for the specimen, wherein the selected three or more salient feature points are shift and rotation invariant because the selected salient feature point detection method is shift and rotation invariant;
　detecting the three or more salient feature points in the test image and the reference image;
　aligning the detected three or more salient feature points in the test image to the detected three or more salient feature points in the reference image;
　aligning remaining portions of the test image to remaining portions of the reference image based on results of aligning the detected three or more salient feature points in the test image to the detected three or more salient feature points in the reference image; and
　after aligning the remaining portions of the test image to the remaining portions of the reference image, detecting defects in the test image by subtracting the reference image from the test image, wherein said selecting, detecting, aligning the detected three or more salient feature points in the test image to the detected three or more salient feature points in the reference image, aligning the remaining portions, and detecting the defects are performed by the computer system.

19. A computer-implemented method for image alignment, comprising:
　generating a test image of a specimen with an imaging subsystem, wherein the imaging subsystem comprises an energy source configured to generate energy directed to the specimen by the imaging subsystem and a detector configured to detect energy from the specimen and to generate output responsive to the detected energy, wherein the imaging subsystem is configured to generate the test image from the output generated by the detector, and wherein the specimen comprises a wafer or a reticle;
　selecting three or more salient feature points for use in test image to reference image alignment by applying a selected salient feature point detection method to at least a reference image generated for the specimen, wherein the selected three or more salient feature points are shift and rotation invariant because the selected salient feature point detection method is shift and rotation invariant;
　detecting the three or more salient feature points in the test image and the reference image;
　aligning the detected three or more salient feature points in the test image to the detected three or more salient feature points in the reference image;
　aligning remaining portions of the test image to remaining portions of the reference image based on results of aligning the detected three or more salient feature points in the test image to the detected three or more salient feature points in the reference image; and
　after aligning the remaining portions of the test image to the remaining portions of the reference image, detecting defects in the test image by subtracting the reference image from the test image, wherein said selecting, detecting, aligning the detected three or more salient feature points in the test image to the detected three or more salient feature points in the reference image, aligning the remaining portions, and detecting the defects are performed by a computer subsystem.

\* \* \* \* \*